(12) United States Patent
Sakai et al.

(10) Patent No.: US 12,449,383 B2
(45) Date of Patent: Oct. 21, 2025

(54) VEHICLE BATTERY INSPECTION DEVICE

(71) Applicant: HONDA MOTOR CO., LTD., Tokyo (JP)

(72) Inventors: Hideki Sakai, Saitama (JP); Atsushi Sakurai, Saitama (JP); Tatsuya Hattori, Saitama (JP); Yuji Isogai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 18/162,716

(22) Filed: Feb. 1, 2023

(65) Prior Publication Data

US 2023/0258582 A1 Aug. 17, 2023

(30) Foreign Application Priority Data

Feb. 17, 2022 (JP) ................................. 2022-022972

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/646* (2013.01)

(58) Field of Classification Search
CPC ............... G01N 23/083; G01N 23/046; G01N 2223/646; G01N 2223/3303; G01N 23/04;

(Continued)

(56) References Cited

U.S. PATENT DOCUMENTS 6,542,580 B1 * 4/2003 Carver ................... G01N 23/04
378/57
6,763,635 B1 * 7/2004 Lowman ................. B66C 17/06
52/114

(Continued)

FOREIGN PATENT DOCUMENTS

JP 2001203003 A 7/2001
JP 2003065973 A 3/2003

(Continued)

OTHER PUBLICATIONS

Mechanical Systems Promotion Association—Strategy formulation regarding the introduction of large-scale industrial X-ray CT equipment—Summary of results of the Heisei 30(2018) innovation strategy formulation project, 2019, 109P.

(Continued)

*Primary Examiner* — Irakli Kiknadze
(74) *Attorney, Agent, or Firm* — CKC & Partners Co., LLC (57) ABSTRACT

The vehicle battery inspection device includes a circular ring-shaped rail 10; a vehicle stand 20 that is arranged inside the rail 10, on the vehicle stand 20 the vehicle can self-travel substantially along the axial direction of the rail 10; a vehicle stand driver 30 that movably supports the vehicle stand 20; an X-ray source 40 configured to be movable along a circumferential direction of the rail 10 and irradiates the vehicle on the vehicle stand 20 with X-rays; an X-ray detector 50 configured to be movable in synchronization with the X-ray source 40 along the circumferential direction while being held in an orientation facing the X-ray source 40 and detects the X-rays to output an X-ray CT image of the battery; and a controller 90 which controls the vehicle stand driver 30 to arrange the battery at a location of inspection with the X-rays.

2 Claims, 5 Drawing Sheets

(58) Field of Classification Search
CPC ................ G01N 23/10; G01N 23/043; G01N
2223/1016; G01N 23/18; G01N
2223/3307; G01N 2223/204; G01N
2223/50; G01N 2223/643; G01N
2223/33; G01N 23/20008; G01N 23/20;
G01N 23/06; G01N 2223/419; G01N
2223/304; G01N 2223/652; G01N
2223/401; G01T 1/2012; G01V 5/223;
G01V 5/226; G01V 5/22; G01V 5/232;
G01V 5/224; G01V 5/281; G01V 5/222;
G01V 5/0016; G01V 5/0025; G01V
5/0091; H01M 10/04; H01M 10/0413;
H01M 10/0585; H01M 10/48; H01M
10/4285; Y02E 60/10; B07C 5/346; G06T
7/001; G06T 2207/30156; G06T 2200/04;
G06T 7/73; G06T 5/94; G06T 7/74;
G06T 7/90; G06T 2207/30168; G06T
2207/30164; B24B 51/00; B24B 7/10;
H04N 9/646
USPC .............................................. 378/20, 57, 62
See application file for complete search history.

(56) References Cited

U.S. PATENT DOCUMENTS

| | | | | |
|---|---|---|---|---|
| 6,785,357 | B2* | 8/2004 | Bernardi | G01V 5/20 378/57 |
| 7,369,643 | B2* | 5/2008 | Kotowski | G01V 5/20 378/197 |
| 7,379,530 | B2* | 5/2008 | Hoff | G01V 5/22 378/57 |
| 7,929,664 | B2* | 4/2011 | Goodenough | G01T 1/2012 378/53 |
| 8,369,482 | B2* | 2/2013 | Park | G01N 23/083 378/58 |
| 8,472,583 | B2* | 6/2013 | Star-Lack | G01V 5/226 378/57 |
| 8,503,605 | B2* | 8/2013 | Morton | G01V 5/222 378/57 |
| 8,824,632 | B2* | 9/2014 | Mastronardi | G01V 5/223 378/57 |
| 10,082,596 | B2* | 9/2018 | Hu | B65G 47/66 |
| 10,962,677 | B2* | 3/2021 | Jegou | G01N 23/10 |
| 2007/0098142 | A1* | 5/2007 | Rothschild | G01N 23/203 378/57 |
| 2011/0026673 | A1* | 2/2011 | Mastronardi | G01V 5/20 378/57 |
| 2015/0378048 | A1* | 12/2015 | Schubert | G01V 5/222 378/57 |
| 2018/0156741 | A1 | 6/2018 | Kang et al. | |
| 2022/0044380 | A1* | 2/2022 | Tsubaki | G06T 7/001 |
| 2024/0310305 | A1* | 9/2024 | Chen | G01N 23/10 |

FOREIGN PATENT DOCUMENTS

| | | |
|---|---|---|
| JP | 2015083932 A | 4/2015 |
| JP | 2019168360 A | 10/2019 |
| JP | 2019532266 A | 11/2019 |
| JP | 2021025848 A | 2/2021 |
| JP | 2021110633 A | 8/2021 |

OTHER PUBLICATIONS

Wolfgang Holub et al., RoboCT—Application for in-situ Inspection of Join Technologies of large scale Objects, International Symposium on Digital Industrial Radiology and Computed Tomography, 2019 pp. 1-7.
Notification of Reasons for Refusal issued in the JP Patent Application No. 2022-022972, mailed on Oct. 24, 2023.
Notification of Reasons for Refusal issued in the JP Patent Application No. 2022-022972, mailed on Feb. 20, 2024.

* cited by examiner

VEHICLE BATTERY INSPECTION DEVICE

This application is based on and claims the benefit of priority from Japanese Patent Application No. 2022-022972, filed on 17 Feb. 2022, the benefit of which is incorporated herein by reference.

BACKGROUND OF THE INVENTION

Field of the Invention

The present invention relates to a vehicle battery inspection device that inspects internal structure, state, etc. of a battery mounted on a vehicle.

Related Art

A battery, such as a secondary battery, that supplies power to a motor is mounted on an electric vehicle, such as an electric automobile or a hybrid vehicle, on which the motor is mounted. The battery of this type is, for example, mounted on, e.g., a lower portion of the vehicle in the form of a battery pack in which a module including a plurality of battery cells is housed in a case. There is a probability that an abnormality such as deterioration or short-circuit is caused in such an in-vehicle battery mounted on a vehicle over time or due to repeated charging and discharging, and for this reason, measures need to be taken against such an abnormality. For example, Japanese Unexamined Patent Application, Publication No. 2001-203003 discloses a technique for inspecting a secondary battery deterioration state based on an X-ray CT image obtained from X-rays having penetrated a secondary battery. The same document also describes a device that irradiates, by an X-ray generator, a battery set on a rotating table with X-rays and detects, by an X-ray detector, the X-rays having penetrated the battery.
Patent Document 1: Japanese Unexamined Patent Application, Publication No. 2001-203003

SUMMARY OF THE INVENTION

The method for inspecting the battery by X-ray emission has an advantage that inspection is quick and easy as compared to the case of inspection based on a discharge amount measured by discharging after the battery has been fully charged. However, for the conventional device that irradiates, with the X-rays, the battery targeted for inspection on the rotating table as described above, a process of attaching the battery to the vehicle or detaching the battery from the vehicle is required. For this reason, there is still room for improvement in speed and simplicity.

For these reasons, it is an object of the present invention to provide a vehicle battery inspection device capable of quickly and easily inspecting a battery mounted on a vehicle as compared to a conventional device.

(1) The vehicle battery inspection device according to the present invention is a vehicle battery inspection device for inspecting a battery mounted on a vehicle. The vehicle battery inspection device includes a rail that has a circular ring shape and is installed with an axial direction thereof extending substantially along the horizontal direction; a vehicle stand that is arranged inside the rail, on the vehicle stand the vehicle can self-travel substantially along the axial direction of the rail; a vehicle stand driver that movably supports the vehicle stand arranged inside the rail; an X-ray source configured to be movable along a circumferential direction of the rail, and irradiates the vehicle on the vehicle stand with X-rays; an X-ray detector configured to be movable in synchronization with the X-ray source along the circumferential direction of the rail while being held in an orientation facing the X-ray source on the rail, and detects the X-rays emitted from the X-ray source to output an X-ray CT image of the battery; and a controller which controls the vehicle stand driver to arrange the battery at a location of inspection with the X-rays emitted from the X-ray source.

(2) In the vehicle battery inspection device according to (1) of the present invention, the battery is preferably provided with a marker that is detectable by the X-ray detector.

(3) The vehicle battery inspection device according to (1) or (2) of the present invention preferably further includes an imager that images the vehicle, and the controller preferably controls the vehicle stand driver based on a design drawing of the vehicle imaged by the imager.

(1) According to the present invention, an internal state of the battery can be recognized without detachment of the battery from the vehicle and damage of the battery, and therefore, the battery mounted on the vehicle can be quickly and easily inspected as compared to a conventional case. Faster inspection leads to improvement in energy efficiency.

(2) According to the present invention, since the marker detectable by the X-ray detector is further provided, the location of the battery is adjusted such that the detected marker is arranged in the vicinity of the center of an X-ray emission area of the X-ray source, and therefore, the battery can be arranged in the vicinity of the center of the X-ray emission area of the X-ray source with high accuracy. Thus, the obtained X-ray CT image is clearer, and therefore, the internal state of the battery can be more specifically inspected.

(3) According to the present invention, since the imager that images the vehicle is further provided and the controller controls the vehicle stand driver based on the design drawing of the vehicle imaged by the imager, the battery can be automatically and quickly arranged in the X-ray emission area of the X-ray source, and as a result, the efficiency of inspection can be enhanced. Enhancement of the efficiency of inspection leads to improvement in energy efficiency.

DETAILED DESCRIPTION OF THE INVENTION

Figure 1:
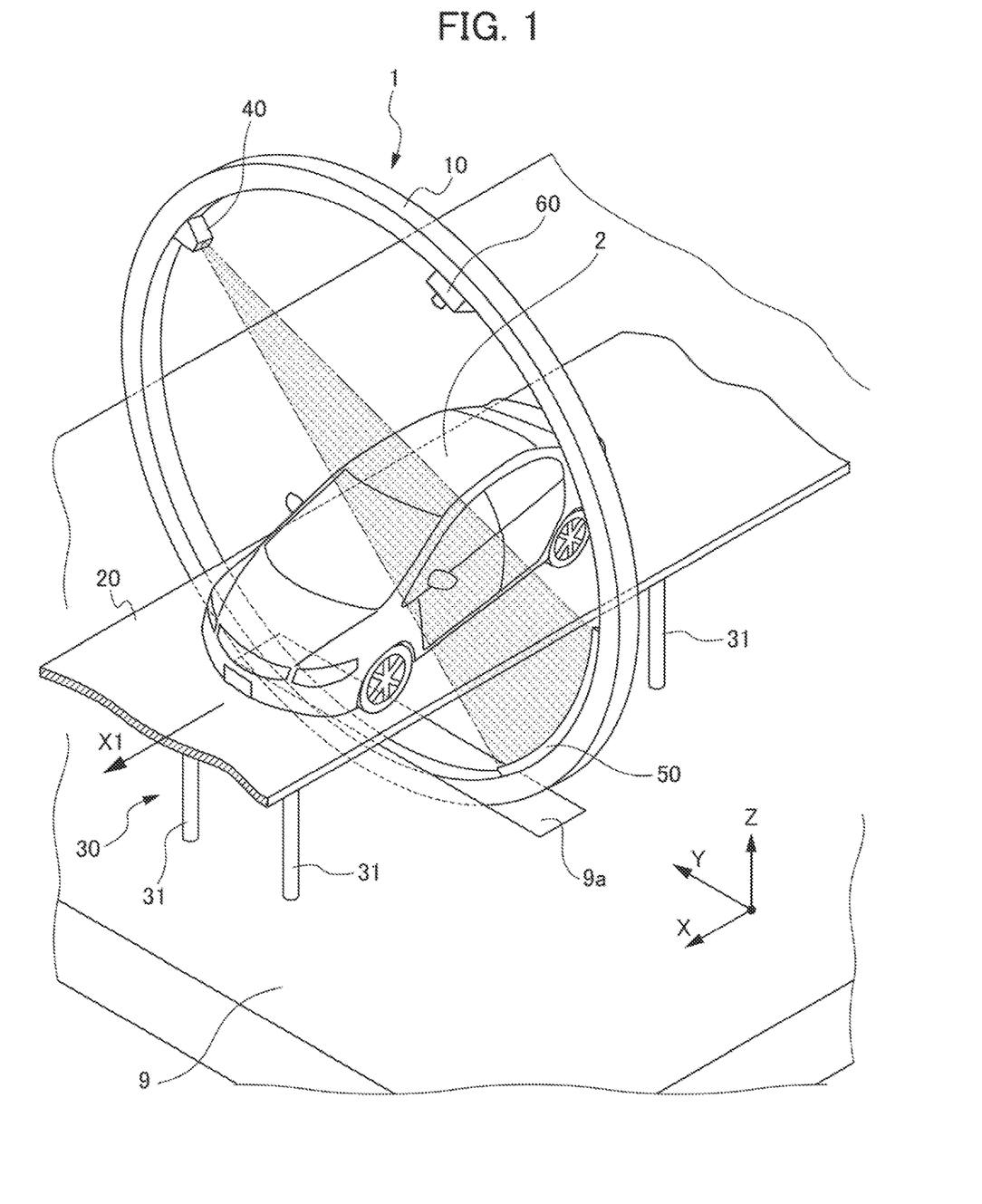
FIG. 1 is a perspective view schematically showing a vehicle battery inspection device according to an embodiment of the present invention.
Figure 2:
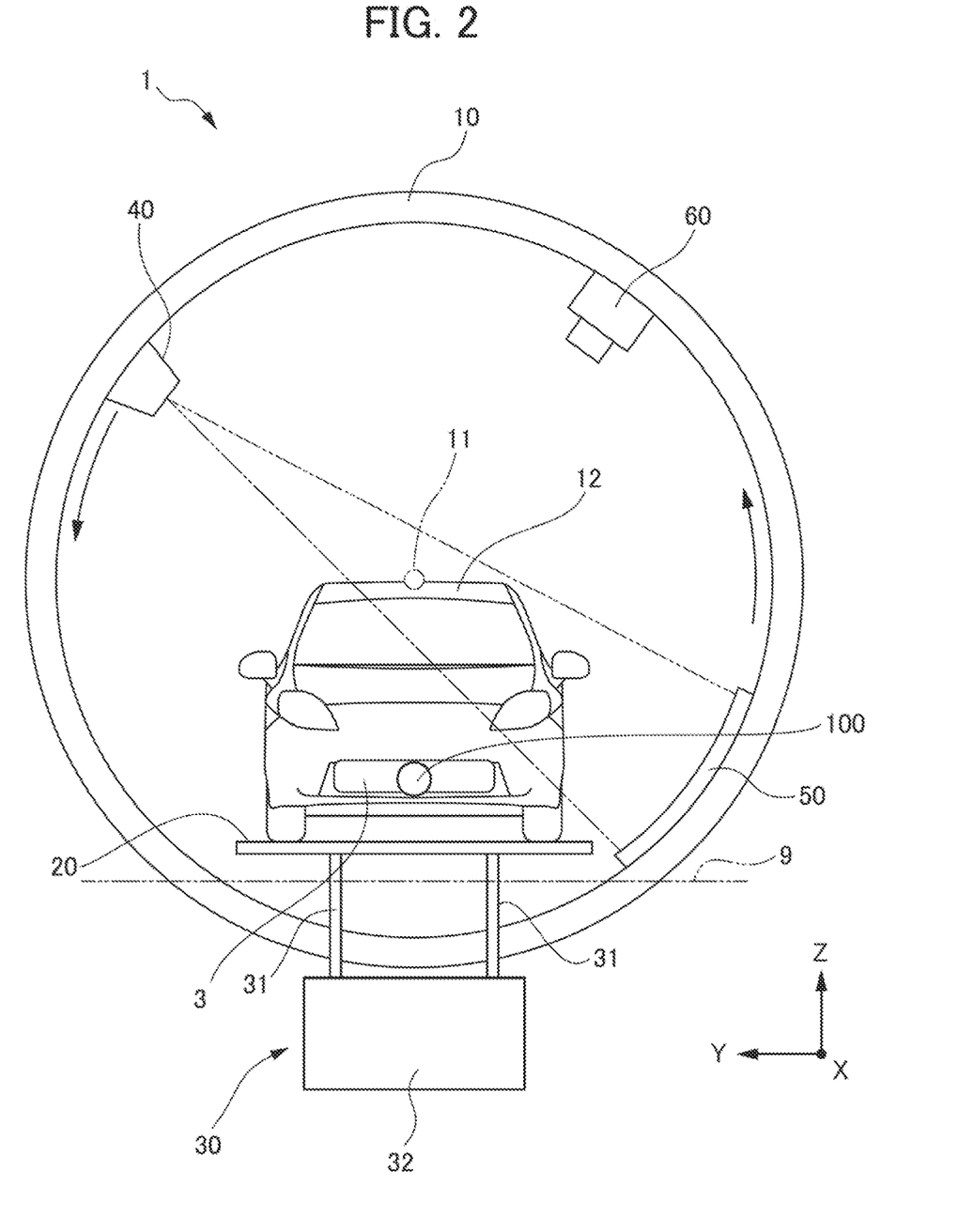
FIG. 2 is a front view schematically showing the vehicle battery inspection device according to the embodiment of the present invention in a state in which a vehicle stand is at a lower location.
Figure 3:
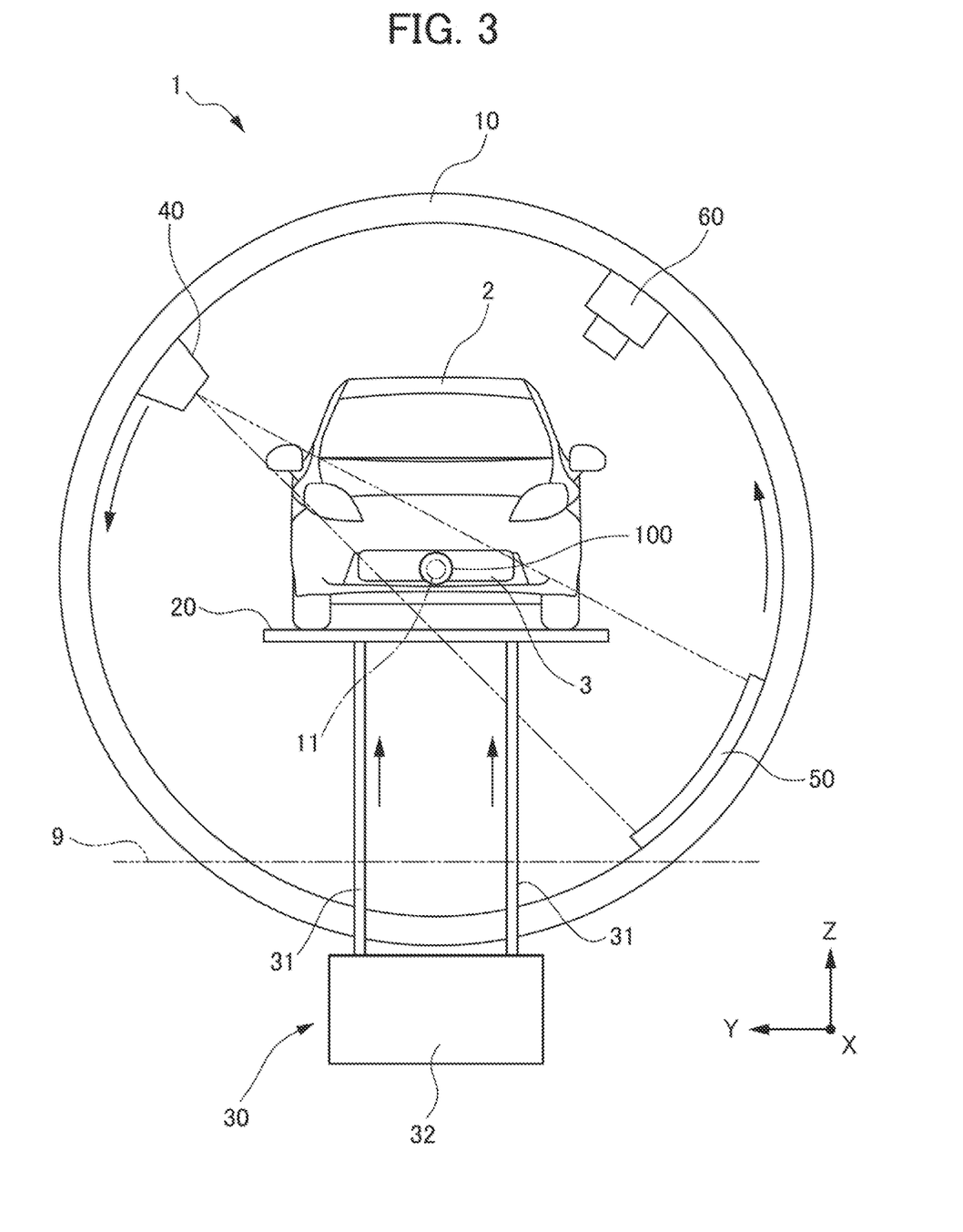
FIG. 3 is a front view schematically showing the vehicle battery inspection device according to the embodiment of the present invention in a state in which the vehicle stand is at an upper inspection location.
Figure 4:
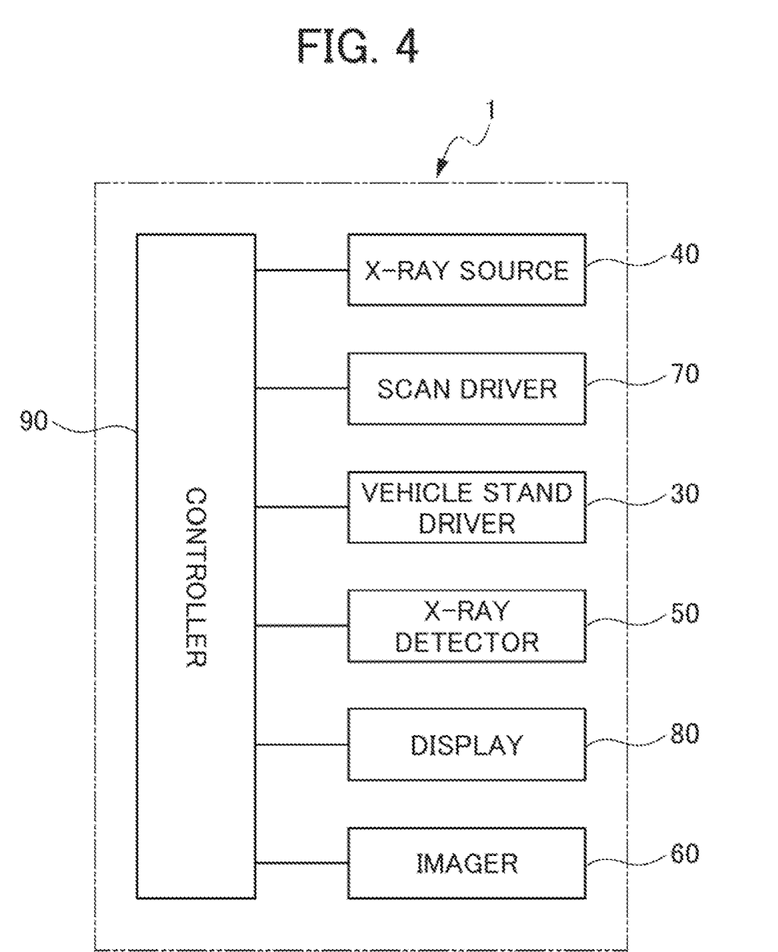
FIG. 4 is a block diagram showing the configuration of the vehicle battery inspection device according to the embodiment of the present invention.

Hereinafter, a vehicle battery inspection device according to an embodiment of the present invention will be described with reference to the drawings. FIG. 1 is a perspective view schematically showing a vehicle battery inspection device (hereinafter referred to as a battery inspection device for short) 1 of the embodiment. FIGS. 2 and 3 are front views schematically showing the battery inspection device 1. FIG. 4 is a block diagram showing the configuration of the battery inspection device 1.

The battery inspection device 1 of the embodiment is installed at an indoor inspection location on a floor 9 on which an automotive four-wheeled vehicle (hereinafter referred to as an automobile for short) 2 which is a vehicle can be brought in, as shown in, e.g., FIG. 1.

The automobile 2 of the embodiment is an electric automobile on which only a motor is mounted as a power source or an electric vehicle, such as a hybrid vehicle, on which an engine and a motor are mounted as a power source. As shown in FIG. 2, a battery pack 3 that supplies power to a motor is, as a battery according to the present invention, mounted on the automobile 2. The battery pack 3 has such a configuration that a module including a plurality of battery cells (secondary batteries) is housed in a case. The battery pack 3 is mounted on a lower portion of a vehicle body of the automobile 2, such as below a floor. The battery inspection device 1 of the embodiment is a CT scan device that inspects the inside of the battery pack 3.

As shown in FIGS. 1 and 2, the battery inspection device 1 according to the embodiment includes a rail 10, a vehicle stand 20, a vehicle stand driver 30, an X-ray source 40, an X-ray detector 50, and an imager 60.

The rail 10 is a member having a circular ring shape. The rail 10 is installed standing on the floor 9, and an axial direction thereof is substantially along the horizontal direction. In FIGS. 1 to 3, the axial direction of the rail 10 is shown as an X-direction. Moreover, the horizontal direction perpendicular to the X-direction is shown as a Y-direction, and an up-down direction perpendicular to the X-direction and the Y-direction is shown as a Z-direction. A lower portion of the rail 10 is partially housed in a pit 9a provided in the floor 9. The rail 10 has such an inner diameter dimension that the vehicle stand 20 moving up and down in the Z-direction or moving right and left in the Y-direction can be arranged inside the rail 10.

The vehicle stand 20 is arranged inside the rail 10. The vehicle stand 20 is a rectangular stand whose length direction is along the X-direction which is the axial direction of the rail 10, and is arranged substantially along the horizontal XY plane. The automobile 2 is brought onto the vehicle stand 20, and is placed on the vehicle stand 20. The length of the vehicle stand 20 is such a length that the automobile 2 can self-travel a certain distance at a low speed. The length of the vehicle stand 20 is preferably a length about twice to three times as long as the entire length of the automobile 2, for example.

The vehicle stand driver 30 supports the vehicle stand 20 on the floor 9 such that the vehicle stand 20 can move up and down in the Z-direction and move in the right-left direction which is the Y-direction. The vehicle stand driver 30 has a plurality of extendable posts 31 supporting the vehicle stand 20 from below and a drive source 32 that extends or contracts these posts 31 and reciprocates the posts 31 in the Y-direction. The drive source 32 has, for example, an extension-contraction motor that extends or contracts the plurality of posts 31 and a reciprocation motor that collectively reciprocates the extension-contraction motor and the plurality of posts 31 in the Y-direction. Each of the plurality of posts 31 extends in the up-down direction along the Z-direction. Each of the plurality of posts 31 is an extendable member incorporating, e.g., a plurality of tubular members with the tubular members coaxially stacked on each other, and the posts 31 extend or contract in synchronization to move the vehicle stand 20 up and down with the vehicle stand 20 kept substantially in the horizontal state. The configuration of the above-described extension-contraction motor is not limited as long as the each post 31 extends or contracts in synchronization with each other. Note that the vehicle stand driver 30 may only be required to have a function of moving the vehicle stand 20 up and down. Thus, the post 31 is not necessarily of the extendable type. For example, the post 31 may have a fixed length, and the post 31 itself may be moved up and down along an axial direction by the drive source 32 and be reciprocated in the Y-direction.

The X-ray source 40 is an X-ray tube that irradiates an object targeted for inspection with generated X-rays. The object targeted for inspection in the embodiment is the battery pack 3 mounted on the automobile 2. That is, the X-ray source 40 emits the X-rays inward of the rail 10. The X-ray source 40 is movable along a circumferential direction of the rail 10, and can revolve on the rail 10.

The X-ray detector 50 converts the X-rays, which have been emitted from the X-ray source 40 and have penetrated the battery pack 3, into visible light, thereby generating an X-ray CT image based on X-ray distribution. The X-ray detector 50 includes a solid-state image sensor, such as a CCD image sensor, that detects the converted visible light.

The X-ray source 40 is of a type that emits a fan-shaped X-ray beam, called a fan beam, and encompasses the object targeted for inspection, and the X-ray detector 50 is of a corresponding type such that detection elements that receive the fan beam are arrayed in an arc shape. Note that the X-ray source 40 and the X-ray detector 50 are not limited to these configurations. The intensity of the penetrated X-rays detected by the X-ray detector 50 is preferably as high as possible. In the embodiment, the properties of the X-rays emitted from the X-ray source 40 are adjusted such that the intensity of the X-rays having penetrated the object arranged at a center (axial center) location 11 in the rail 10 is the highest and a clear X-ray CT image is detected accordingly. Hereinafter, the center location 11 in the rail 10 will be sometimes referred to as an optimal inspection location 11.

The X-ray source 40 and the X-ray detector 50 rotatably move in synchronization on the rail 10 along the circumferential direction. Such rotary movement is performed by a scan driver 70 shown in FIG. 4. For example, the X-ray source 40 and the X-ray detector 50 may be provided on the rail 10 so as to separately move in the circumferential direction, and the scan driver 70 that moves the X-ray source 40 or the X-ray detector 50 along the rail 10 may be provided at each of the X-ray source 40 and the X-ray detector 50. Alternatively, the X-ray source 40 and the X-ray detector 50 may be coupled to each other through an arc-shaped frame along the rail 10, and may be integrally rotatably moved by rotary movement of the frame along the rail 10 by the scan driver 70.

The imager 60 images the automobile 2 on the vehicle stand 20. The imager 60 of the embodiment is, for example, an optical camera, and is arranged at a predetermined location on the rail 10. The imager 60 is provided for determining the type of automobile 2. Thus, the installation location of the imager 60 is not limited as long as the imager 60 can image the automobile 2 on the vehicle stand 20, but the imager 60 is preferably arranged on the rail 10 for compactifying the battery inspection device 1.

As shown in FIG. 4, the battery inspection device 1 of the embodiment further includes a display 80 and a controller 90.

The display 80 is a display device, such as a liquid crystal display (LCD) device, that displays a plurality of X-ray CT images generated by the X-ray detector 50. The X-ray CT image in this case is a sectional view of the battery pack 3 along the YZ plane, and the display 80 displays sectional views as X-ray CT images processed as necessary.

As shown in FIG. 4, the controller 90 controls the imager 60, the vehicle stand driver 30, the scan driver 70, the X-ray source 40, the X-ray detector 50, and the display 80. The controller 90 is, for example, a computer such as a personal computer.

The controller 90 saves internal design drawing data on plural types of vehicles including the automobile 2. Such design drawing data includes information such as the size of the battery pack 3, the installation location of the battery pack 3 on the vehicle body, and the shape of the battery pack 3. The controller 90 sends a signal for imaging the automobile 2 to the imager 60, and in response to such a signal, the imager 60 images the automobile 2. Image data based on the image captured by the imager 60 is transmitted to the controller 90, and the controller 90 determines the type of automobile 2 based on such image data. Further, the controller 90 extracts a design drawing corresponding to the determined automobile 2, and matches such a design drawing against the automobile 2. In this manner, the information on the battery pack 3, i.e., the location, size, shape, etc. of the battery pack 3, is recognized. The controller 90 controls to move the vehicle stand 20 up such that the battery pack 3 is at a location including the optimal inspection location 11 which is the center location in the rail 10.

The controller 90 controls the drive source 32 of the vehicle stand driver 30 to extend or contract the plurality of posts 31, thereby moving the vehicle stand 20 up and down.

The controller 90 controls the scan driver 70 to rotatably move the X-ray source 40 and the X-ray detector 50 in synchronization along the rail 10, thereby revolving the X-ray source 40 and the X-ray detector 50 a predetermined number of times. The controller 90 sends an X-ray emission signal to the X-ray source 40, and in response to such a signal, the X-ray source 40 emits the X-rays. At the same time, the controller 90 controls the X-ray detector 50 to detect the X-rays having penetrated the battery pack 3, thereby generating the X-ray CT image of the battery pack 3. As described above, the controller 90 controls the X-ray source 40 to emit the X-rays while the X-ray source 40 and the X-ray detector 50 are revolving. In this manner, the X-ray CT image which is the sectional image of the battery pack 3 is captured.

The X-ray detector 50 captures X-ray CT images plural times at preset timing. The controller 90 controls the X-ray detector 50 to transmit these X-ray CT images to the display 80, and the display 80 displays these X-ray CT images. With this configuration, the X-ray CT images of the battery pack 3 can be obtained from all directions of 360° in a plane substantially along the vertical direction, and can be displayed on the display 80.

The battery inspection device 1 according to the embodiment further includes a marker 100 arranged in the battery pack 3. The marker 100 may be a component of the battery pack 3, and more preferably, may be an object made of metal, such as lead, having a high X-ray detection sensitivity or an object having a unique shape (e.g., a star shape) that no component of the battery pack 3 has. The marker 100 is continuously arranged in a front-rear direction which is a travelling direction of the automobile 2. When the battery pack 3 is arranged at the optimal inspection location 11 by upward movement of the vehicle stand 20, the controller 90 finely adjusts the location of the battery pack 3 in the up-down direction based on the location of the marker 100 detected by the X-ray detector 50 such that the battery pack 3 is arranged at the optimal inspection location 11, and therefore, the battery pack 3 can be arranged at the optimal inspection location 11 with high accuracy.

The above-described configuration is the configuration of the battery inspection device 1 according to the embodiment. Next, the form of control by the controller 90 will be described with reference to FIG. 5. Note that such a control form is one example and the present invention is not limited to above.

First, at an initial stage, the vehicle stand 20 is moved down to the floor 9, and the self-travelling automobile 2 is driven and brought onto the vehicle stand 20 and is stopped on the vehicle stand 20. The automobile 2 travels forward and is stopped on a rear portion of the vehicle stand 20, taking the direction of an arrow X1 in FIG. 1 as a forward direction. In this state, the imager 60 images the automobile 2 (Step S01), and the type of automobile 2 is determined (Step S02). Note that Step S01 may include communicating the imaging data to the controller 90. Next, the location of the battery pack 3 is recognized based on the design drawing corresponding to the determined automobile 2 (Step S03).

Figure 5:
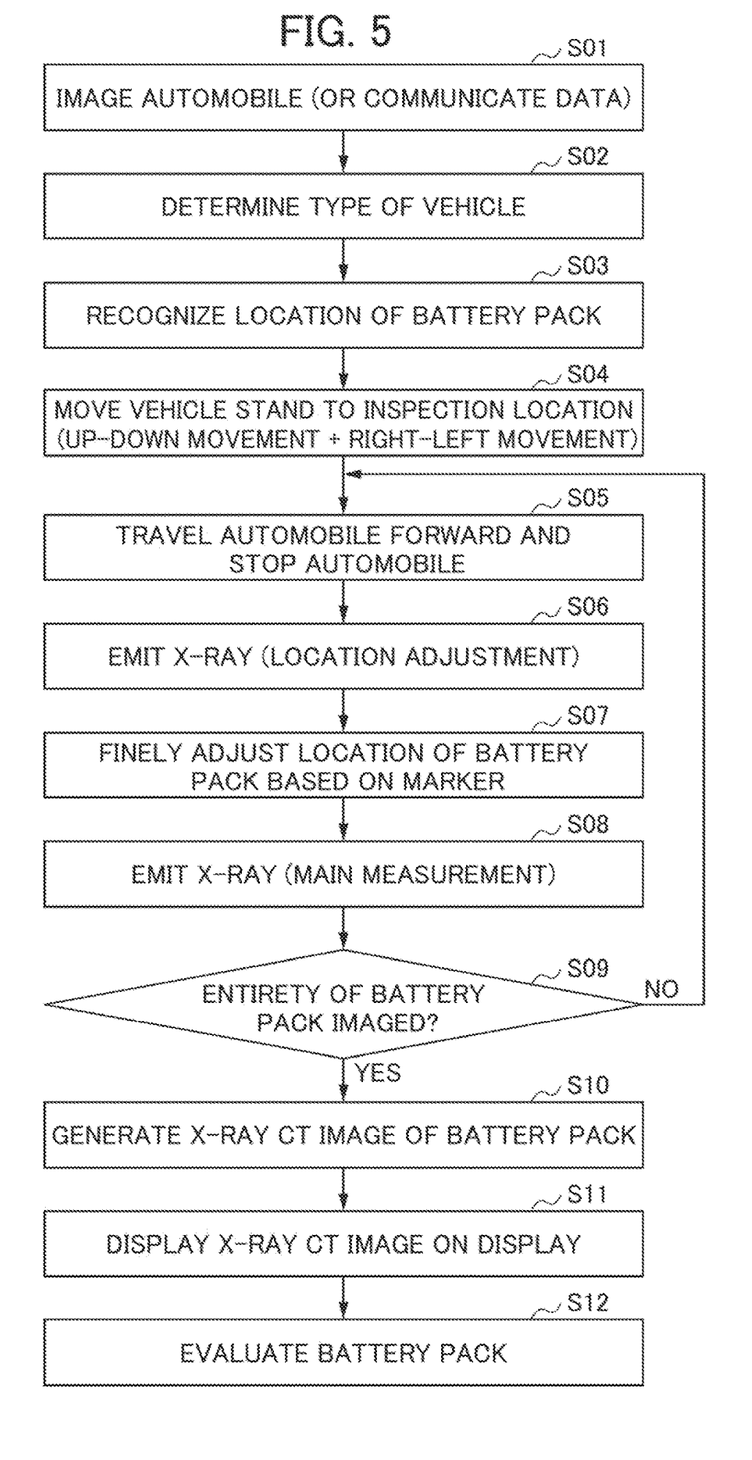
FIG. 5 is a flowchart showing steps of inspecting a battery by the vehicle battery inspection device according to the embodiment of the present invention.

Next, the vehicle stand 20 is moved up by the vehicle stand driver 30, and as necessary, is moved in the right-left direction (the Y-direction). Such movement is stopped when the battery pack 3 approaches the optimal inspection location 11 from the rear (Step S04). In Step S04, the location of the automobile 2 is roughly adjusted. Next, the automobile 2 is driven and travels forward at a safe low speed, and when the marker 100 of the battery pack 3 is arranged at the optimal inspection location 11, the automobile 2 is stopped (Step S05).

Next, while the X-ray source 40 and the X-ray detector 50 are revolving by rotary movement, the X-ray source 40 emits the X-rays. In this manner, the emission location is adjusted to the marker 100 (Step S06). As necessary, the automobile 2 travels forward or rearward in order to finely adjust the location of the battery pack 3 such that the location of the marker 100 is at the optimal inspection location 11 (Step S07). Next, in main measurement, the revolving X-ray source 40 emits the X-rays while the automobile 2 is travelling forward. The battery pack 3 is detected by the X-ray detector 50 during forward movement of the automobile 2, and it is determined whether or not the entirety of the battery pack 3 has been detected (Step S09). In a case where the entirety of the battery pack 3 is not detected yet, the processing returns to Step S05, and X-ray emission is continued while the automobile 2 is travelling forward (Steps S05 to S08). When it is determined in Step S09 that the entirety of the battery pack 3 has been detected, the travelling automobile 2 is stopped, and the X-ray CT images of the battery pack 3 are generated by the X-ray detector 50 (Step S10). These X-ray CT images are displayed on the display 80 (Step S11).

As described above, the X-ray CT images of the battery pack 3 are displayed on the display 80 while the X-ray source 40 and the X-ray detector 50 are continuously revolving on the rail 10. From these X-ray CT images, the thickness, capacity, etc. of each element of the battery pack 3 are analyzed, and an evaluation as compared to a standard model is made (Step S12).

As the evaluation of the battery pack 3, for example, a deterioration state is evaluated from an internal battery cell structure of the battery pack 3 indicated by the X-ray CT images, and performance of the battery pack 3 is determined accordingly. The degree of deterioration can be determined, as compared to X-ray CT images of a new battery cell, from aging such as a color change or electrode deformation. The degree of deterioration can also be determined by comparison of a geometric parameter in the battery cell. For example, the geometric parameter may include a ratio between the area of an electrode portion and the area of a non-electrode portion in the battery cell, amount of change in thickness of the electrode portion, and the size of the expanded case of the battery pack 3.

By these methods, deterioration of the battery pack 3 can be visually determined from the X-ray CT images displayed on the display 80. Alternatively, the controller 90 may convert the X-ray CT images into data, and by comparison between such data and a reference value, deterioration may be automatically determined. Note that the battery pack 3 needs to be replaced in a case where deterioration is at a degree falling below the reference and the efficiency of maintenance is enhanced when such a replacement process is performed using, e.g., a robot.

The battery inspection device 1 according to the above-described embodiment is the device that inspects the battery pack 3 which is the battery mounted on the vehicle, i.e., the automobile 2. According to the battery inspection device 1, the following advantageous effects are produced.

(1) The battery inspection device 1 according to the embodiment includes the rail 10 that has the circular ring shape and is installed with the axial direction thereof extending substantially along the horizontal direction; the vehicle stand 20 that is arranged inside the rail 10, the vehicle stand 20 being configured to receive the vehicle such that the vehicle can self-travel substantially along the axial direction of the rail 10; the vehicle stand driver 30 that movably supports the vehicle stand 20 arranged inside the rail 10; the X-ray source 40 configured to be movable along a circumferential direction of the rail 10 and, in a case where the vehicle has been received by the vehicle stand 20, to irradiate the vehicle on the vehicle stand 20 with X-rays; the X-ray detector 50 configured to be movable in synchronization with the X-ray source 40 along the circumferential direction of the rail 10 while being held in an orientation facing the X-ray source 40 on the rail and, in a case where the X-ray source emits X-rays towards the vehicle, to detect the X-rays emitted from the X-ray source to output an X-ray CT image of the battery; and controller 90 configured to control the vehicle stand driver 30 to, in a case where the vehicle has been received by the vehicle stand 20, arrange the battery at a location of inspection with the X-rays emitted from the X-ray source 40.

With this configuration, the internal state of the battery pack 3 can be recognized without detachment of the battery pack 3 from the vehicle body of the automobile 2 and damage of the battery pack 3, and therefore, the battery pack 3 mounted on the automobile 2 can be quickly and easily inspected as compared to a conventional case. Speed-up in inspection leads to improvement in an energy efficiency.

(2) The battery inspection device 1 according to the embodiment preferably further includes the marker 100 that is arranged on the battery pack 3 and is detectable by the X-ray detector 50.

The location of the battery pack 3 is adjusted such that the detected marker 100 is arranged at the optimal inspection location 11, and therefore, the battery pack 3 can be arranged at the optimal inspection location 11 with high accuracy. Thus, the X-ray CT images displayed on the display 80 are clearer, and therefore, the internal state of the battery pack 3 can be more specifically inspected.

(3) The battery inspection device 1 according to the embodiment preferably further includes the imager 60 that images the automobile 2, and the controller 90 preferably controls the vehicle stand driver 30 based on the design drawing of the automobile 2 imaged by the imager 60.

With this configuration, the battery pack 3 can be automatically and quickly arranged in an X-ray emission area of the X-ray source 40, and therefore, the efficiency of inspection is enhanced. Enhancement of the efficiency of inspection leads to improvement in the energy efficiency.

The specific embodiment of the present invention has been described above, but the present invention is not limited to the above-described embodiment and changes, modifications, etc. made within a scope in which the object of the present invention can be accomplished are also included in the scope of the present invention.

For example, in addition to up-down movement of the vehicle stand 20 in the Z-direction and right-left movement of the vehicle stand 20 in the Y-direction, the vehicle stand driver 30 may move the vehicle stand 20 in the X-direction.

In the above-described embodiment, the X-ray source 40 rotating along the rail 10 irradiates the automobile 2 with the X-rays while the automobile 2 is self-travelling on the vehicle stand 20. However, the rail 10 may be movable in the axial direction (the X-direction), and the X-rays may be emitted while the rail 10 is moving in the X-direction. In this case, after the location of the automobile 2 has been adjusted to the X-ray emission location in Step S06 of FIG. 5, the X-rays are preferably emitted while the X-ray emission location is being finely adjusted by movement of the rail 10 in the X-direction. This configuration may be effective in a case where the weight of the battery pack 3 is great and it is difficult to adjust the location with high accuracy by self-travelling of the automobile 2.

As the marker 100 for determining the location for inspection of the battery pack 3 with high accuracy, a member forming part of the battery pack 3 may be used as a substitute. For example, an end plate incorporating the plurality of battery cells or the case of the battery pack 3 may be used as the marker.

EXPLANATION OF REFERENCE NUMERALS

1 Vehicle Battery Inspection Device
2 Automotive Four-Wheeled Vehicle (Vehicle)
3 Battery Pack (Battery)
10 Rail
20 Vehicle Stand
30 Vehicle Stand Driver
40 X-Ray Source
50 X-Ray Detector
60 Imager
90 Controller
100 Marker

What is claimed is:
1. A vehicle battery inspection device for inspecting a battery mounted on a vehicle, comprising:
   a rail that has a circular ring shape and is installed with an axial direction thereof extending substantially along a horizontal direction;
   a vehicle stand that is arranged inside the rail, on the vehicle stand the vehicle can self-travel substantially along the axial direction of the rail;
   a vehicle stand driver that movably supports the vehicle stand arranged inside the rail;

an X-ray source configured to be movable along a circumferential direction of the rail and irradiates the vehicle on the vehicle stand with X-rays;

an X-ray detector configured to be movable in synchronization with the X-ray source along the circumferential direction of the rail while being held in an orientation facing the X-ray source on the rail, and detects the X-rays emitted from the X-ray source to output an X-ray CT image of the battery;

a controller which controls the vehicle stand driver to arrange the battery at a location of inspection with the X-rays emitted from the X-ray source; and an imager that images the vehicle;

wherein the controller controls the imager to image the vehicle arranged on the vehicle stand, and the controller extracts information of internal structure of the vehicle related to the battery from a design drawing corresponding to the vehicle based on the image of the vehicle imaged by the imager, and controls the vehicle stand driver based on the information from the design drawing, wherein the information includes size of the battery, an installation location of the battery on the vehicle, and a shape of the battery.

2. The vehicle battery inspection device according to claim 1, wherein the battery is provided with a marker that is detectable by the X-ray detector.

* * * * *